United States Patent [19]

Santagiuliana

[11] Patent Number: 5,495,964
[45] Date of Patent: Mar. 5, 1996

[54] MEASURING/DISPENSING DEVICE FOR GRANULAR OR POWDER PRODUCTS

[75] Inventor: Evans Santagiuliana, Vicenza, Italy

[73] Assignee: Taplast SRL, Dueville, Italy

[21] Appl. No.: 244,777

[22] PCT Filed: Oct. 29, 1993

[86] PCT No.: PCT/EP93/03030

§ 371 Date: Jun. 10, 1994

§ 102(e) Date: Jun. 10, 1994

[87] PCT Pub. No.: WO94/10541

PCT Pub. Date: May 11, 1994

[30] Foreign Application Priority Data

Nov. 2, 1992 [IT] Italy .................................. VI92A0167

[51] Int. Cl.[6] ................................................. G01F 11/26
[52] U.S. Cl. ........................ 222/455; 222/456; 222/457.5
[58] Field of Search ................................... 222/454–456, 222/457.5, 434

[56] References Cited

U.S. PATENT DOCUMENTS

| | | | |
|---|---|---|---|
| 2,091,929 | 8/1937 | Kappenberg | 222/457 |
| 3,137,418 | 6/1964 | Mullen | 222/457 |
| 3,353,725 | 11/1967 | Caceres | 222/456 |
| 4,015,758 | 4/1977 | Cavazza | 222/457.5 |
| 4,346,823 | 8/1982 | Eppenbach | 222/456 |
| 5,029,736 | 7/1991 | Maruyama et al. | 222/456 |
| 5,143,261 | 9/1992 | Drobish | 222/455 |
| 5,386,930 | 2/1995 | Shani | 222/434 |

*Primary Examiner*—Andres Kashnikow
*Assistant Examiner*—Lisa Douglas
*Attorney, Agent, or Firm*—Watson, Cole, Grindle & Watson

[57] ABSTRACT

A measuring and dispensing device for granular powder materials as disclosed. The device includes a first element having a holding chamber and a collecting chamber joined by an interconnecting wall having an opening. A second element is located within the first element and has an outer wall which faces an inner wall of the first element for defining a dispensing duct. The second element has a measuring chamber having an open bottom and another opening connected with the first opening of the first element. A lid applied to the upper part of the first element and has an opening communicating with the dispensing duct to allow for the dispensing of product. The first and second elements have wall portions that converge towards the bottom.

7 Claims, 7 Drawing Sheets

MEASURING/DISPENSING DEVICE FOR GRANULAR OR POWDER PRODUCTS

The invention concerns a measuring/dispensing device for granular or powder products.

A number of measuring/dispensing devices for powder or granular substances find an increasingly wider use on the market. Said devices are applied on containers and make it possible to dispense their contents in pre-determined quantities. Special reference is made to measuring/dispensing devices for detergents and for products for personal and room hygiene and for pharmaceutical purposes.

Some measuring devices belonging to the known technique consist of a measuring chamber, into which the product to be dispensed enters when the container is capsized, and of a collecting chamber, into which the product is transferred from the previously filled up measuring chamber, when the container is brought back to its upright position.

The dispensing of the product occurs when the container is capsized again, when the pre-measured product flows out of the dispensing chamber, while a new quantity of product is transferred from the container into the measuring chamber. The patent for industrial invention which makes the object of the U.S. patent application Ser. No. VI92A000021 in the name of the same inventor of the present invention, describes a measuring/dispensing device, wherein the measuring chamber and the collecting chamber are obtained through fixed surfaces which intersect each other at an angle.

The presence of surfaces intersecting each other at an angle does not allow a very precise measuring, particularly when the container on which the measuring device is applied is handled too abruptly or too slowly or when only a limited amount of product is left in the container.

In order to eliminate the mentioned inconveniences the present invention has the main purpose of disclosing a measuring/dispensing device allowing the dispensing of strictly constant quantities of product, with very limited weight tolerance, even though the measuring and dispensing operations are performed abruptly or too slowly.

Another purpose of the invention is for the measuring/dispensing device to allow the dispensing of strictly constant quantities of product even when the container only holds a limited quantity thereof.

The described purposes and advantages are reached by an improved measuring/dispensing device for granular or powder products which, in accordance with the main claim, comprises:

- a first element, applied on the product container, which comprises a chamber holding the measured product, closed at the bottom and connected with an over-lying collecting chamber through a joining wall complete with at least one first opening;
- a second element coaxially matched inside the holding chamber of the first element, wherein it delimits a dispensing duct, said second element comprising a product-measuring chamber presenting an open bottom and a second opening connected with the mentioned at least one first opening of the mentioned first element;
- a lid applied on the annular rim of the first element and foreseen with at least one opening, communicating with the dispensing duct of said first element, suited to allow the dispensing of the product, and is characterized in that each of the mentioned elements presents slanted walls, converging toward the bottom of the element to which they belong and matching at the top and at the bottom of a same central, essentially cylindrical area. According to a preferred embodiment the second element of the device is eccentrically matched in the holding chamber of the first element and it defines within said holding chamber a dispensing duct arranged at the opposite side of the openings made laterally in said first and second elements, wherein said openings are obtained each in correspondence with at least one slanted wall belonging to the element wherein it is made.

According to a preferred embodiment the holding chamber of the first element and the overlying collecting chamber are divided into two separate zones through a vertical partition allowing also the measuring of partial quantities in relation with the total measured quantity, said partial quantities being dispensable separately or jointly, by suitably adjusting the position of the lid.

According to another embodiment the holding chamber of the first element and the overlying collecting chamber are divided into two zones through a vertical partition, one zone communicating with the interior of the container with which the measuring device is connected through an opening made laterally in the body of the first element and communicating directly with the dispensing duct. Thus, not only is it possible to dispense the pre-determined dose contained in the holding chamber, but it is also possible to dispense continuously by adjusting the lid in a different position.

Advantageously, the measuring/dispensing device according to the invention permits a more precise dosage as compared with the measuring/dispensing devices belonging to the known technique, since the converging profile of the limiting areas of the parts forming it is such, as to improve the conveyance of the product both during the measuring stage and in the dispensing stage.

Therefore, advantageously the measuring/dispensing device according to the invention is more reliable both concerning the measured quantity, since the measuring occurs regardless of how the container to which the measuring/dispensing device is handled and the quantity of product held in the container itself.

Further scope of applicability of the present invention will become apparent from the detailed description given hereinafter. However, it should be understood that the detailed description and the specific examples, while indicating preferred embodiments of the invention, are given by way of illustration only, since various changes and modifications within the spirit and scope of the invention will become apparent to those skilled in the art from this detailed description and from the drawings, wherein.

Figure 1:
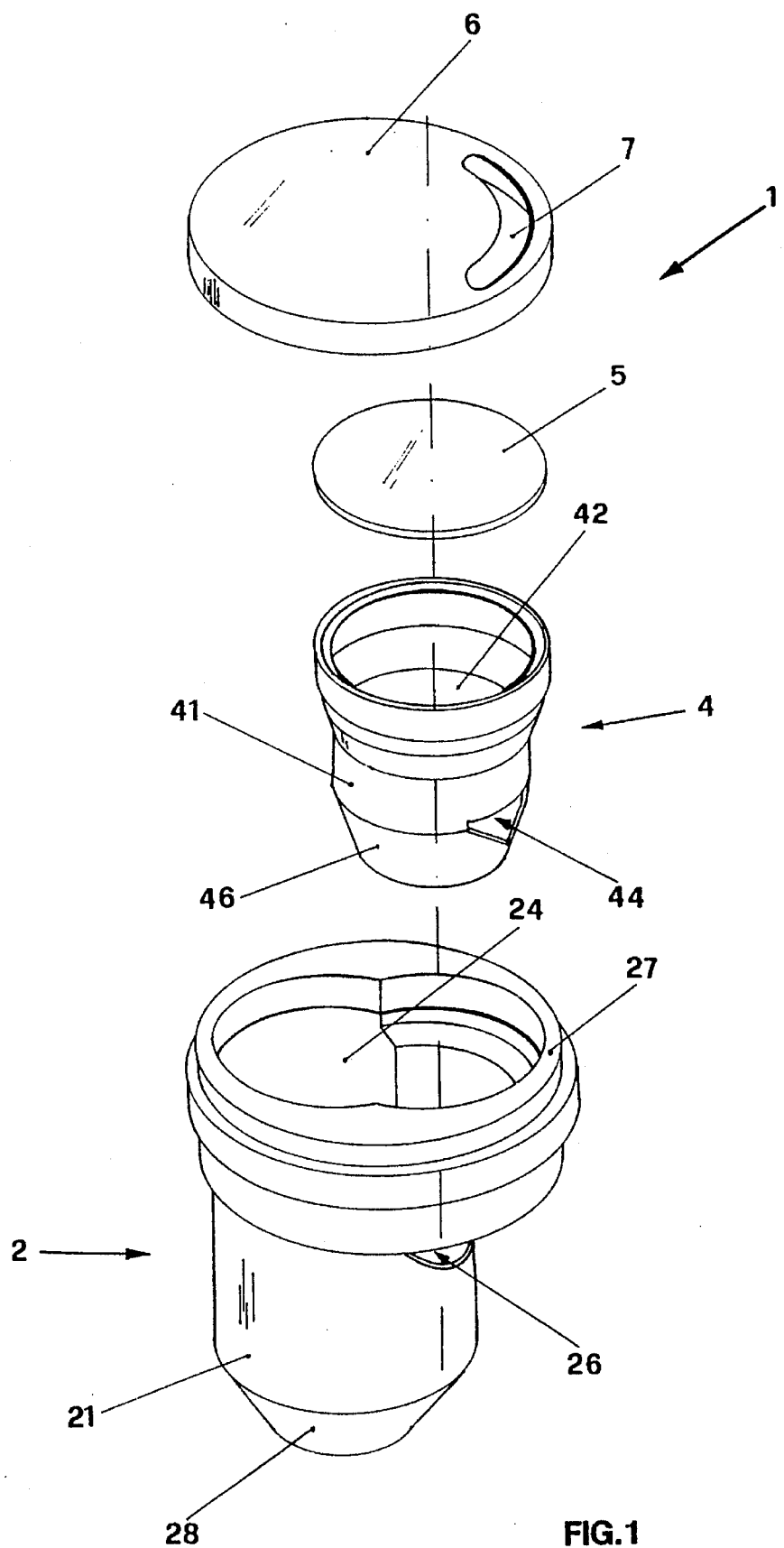
FIG. 1 shows the exploded view of the measuring/dispensing device according to the invention.
Figure 4:
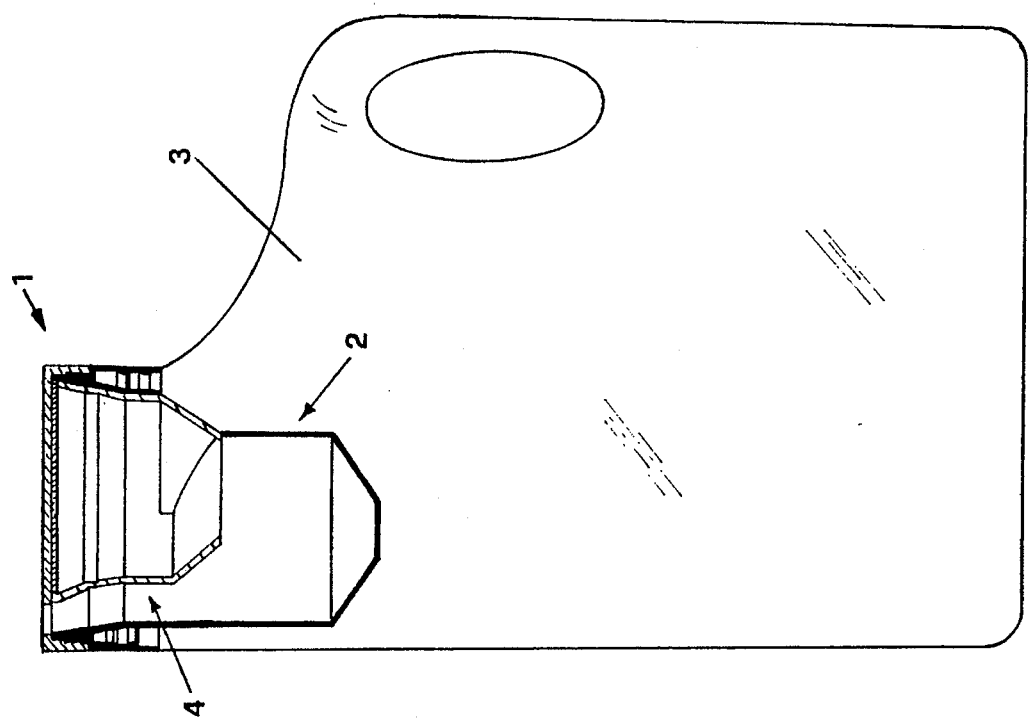
FIG. 4 represents the measuring/dispensing device shown in a cross-section and applied on the product container.

The measuring/dispensing device according to the invention is represented in an exploded drawing in FIG. 1, wherein it is indicated as whole with 1, and it can be observed that it comprises a first element, indicated as whole with 2, which, as can be observed in FIG. 4, is applied on a container 3, a second element 4 complete with a closing cap 5 and, finally, a lid 6 connected with the first element and complete with an opening 7 for the dispensing of the product.

Figure 2:
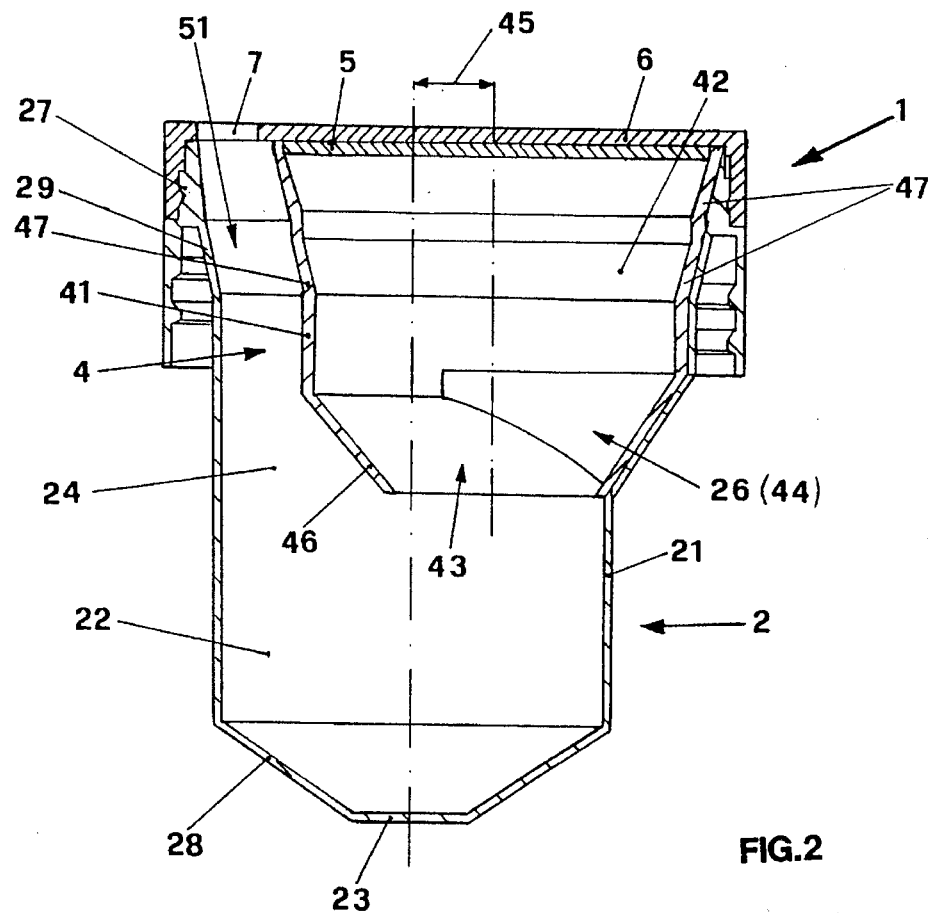
FIG. 2 represents in a cross-section the assembled measuring/dispensing device.
Figure 3:
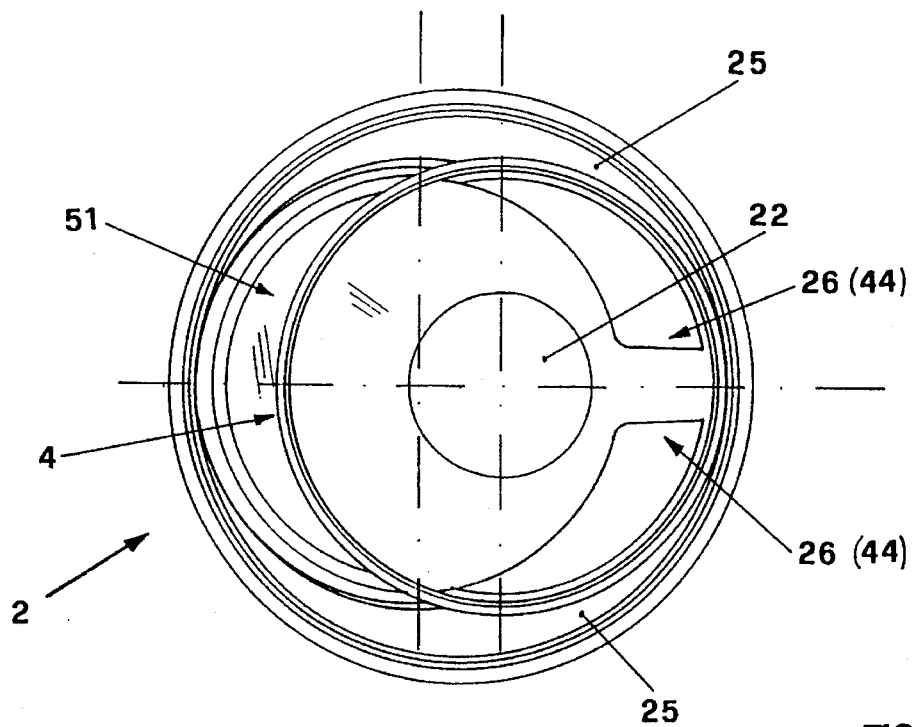
FIG. 3 shows the measuring/dispensing device of FIG. 2 seen from the top and without its lid.
Figure 5:
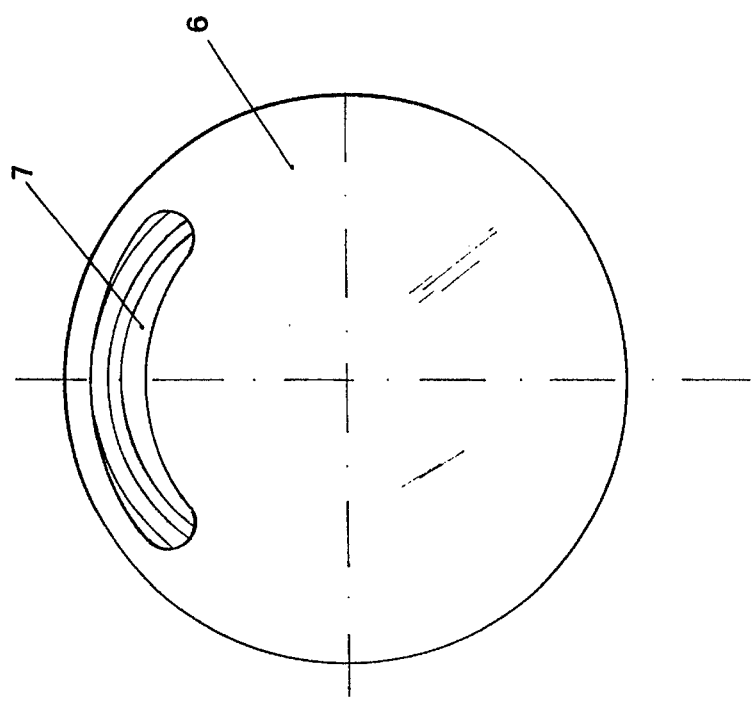
FIG. 5 shows the measuring/dispensing device of FIG. 3 shown from the top and complete with its lid.

In the FIGS. 2 and 3 it can be observed more specifically that the first element 2 comprises a chamber 22 holding the measured product to be dispensed. It is closed at the bottom by a bottom 23 and it matches an overlying collecting chamber 24 through a junction wall 25 complete with the first openings 26.

Still in the FIGS. 2 and 3 it will be observed that the second element, indicated as a whole with 4, comprises a chamber 42 for the measuring of the product, which is closed at the top by an inserted cap 5 and is complete with an open bottom 43 and with a second opening 44 communicating with the first opening 26 of the first element 2, when said second element 4 matches the interior of the collecting chamber 24 of said first element 2.

More specifically it will be observed that the second element 4 is matched within the collecting chamber 24 of the first element 2 and is off center in relation to the same by a distance 45, so that it defines within said holding chamber 24 a dispensing duct 51, which sets the holding chamber 22 in communication with the opening 7 made in the lid 6 which is applied on the upper annular rim 27 of the mentioned first element 2.

It will be pointed out that lid 6 can be made so that, when it is applied on the measuring device it can close also the second element 4, thereby performing also the task of the closing cap 5.

With special reference to the FIG. 2 and 3 it will be observed that the first and the second elements present upper and lower ends matching each other through surfaces which are slanted in relation to their respective central zones.

Thus the first element 2 presents in correspondence with its bottom 23 the slanted matching wall 28 and in correspondence with its top the also slanted matching wall 29, both being connected with an essentially cylindrical central zone 21.

In the same way the second element 4 presents in correspondence with its open bottom 43 the slanted matching wall 46 and in correspondence with its top the also slanted matching wall 47, all said walls being connected with an essentially cylindrical central zone 41 and they are slanted by an inclination converging toward the bottom 23 of the measuring device.

It is the presence of said slanted walls which improves the flow of the product within the measuring/dispensing device during the measuring and dispensing stages by preventing the product from stopping and, therefore, from clogging up the ducts.

The function of the measuring/dispensing device according to the invention foresees a stage during which the product held in the container is measured, when said device is applied in the interior of the measuring chamber 42 of the second element 4; a stage during which the measured product falls into the holding chamber 22 of the first element 2 and then a dispensing stage with the outpour of the product from the holding chamber 22 through the dispensing channel 51, occurring at the same time as another measuring stage of new quantity of product inside the same measuring chamber 42.

Figure 6:
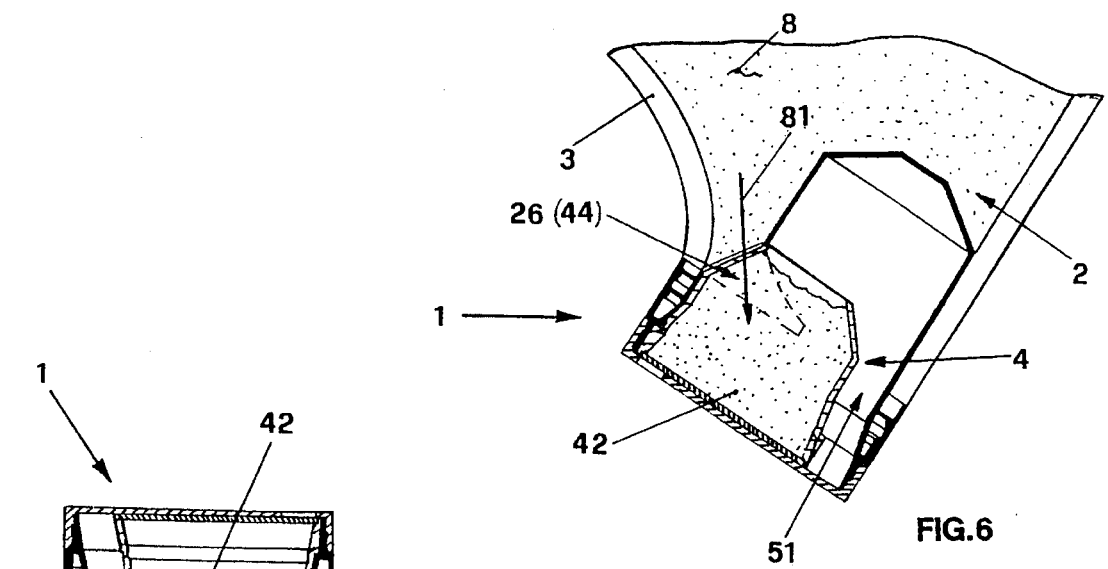
FIG. 6 shows the detail of the measuring/dispensing device according to the invention while the measuring chamber is being filled up.
Figure 7:
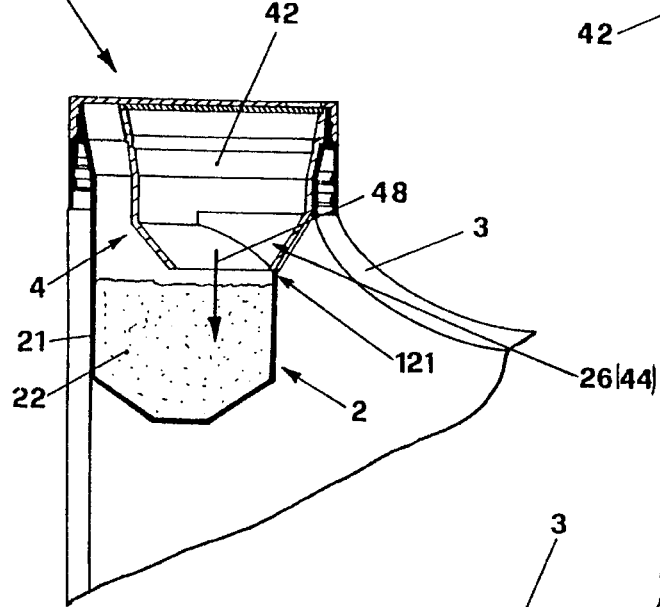
FIG. 7 shows the detail of the measuring/dispensing device while the measured product passes into the holding chamber.
Figure 8:
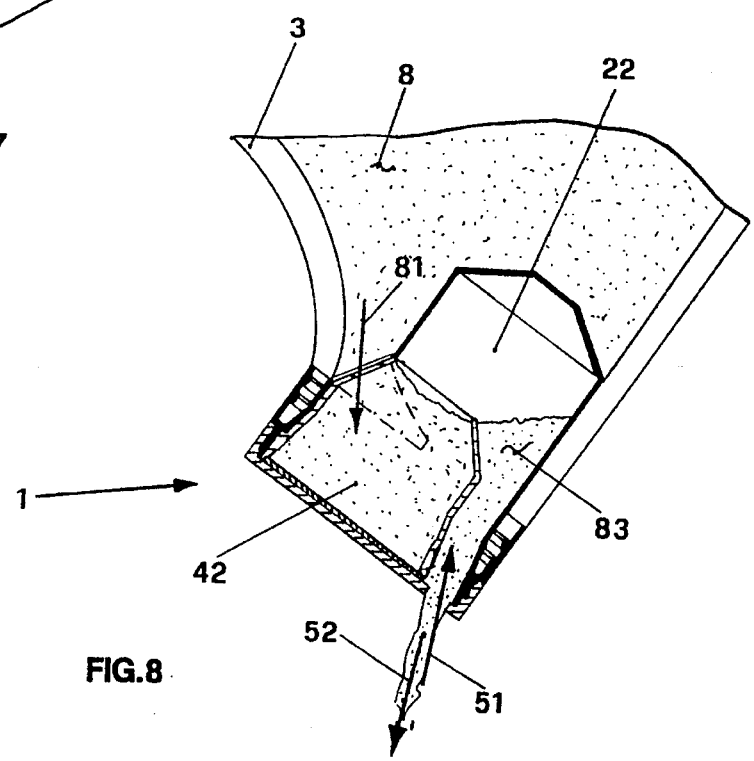
FIG. 8 shows the detail of the measuring/dispensing device according to the invention while the product coming from the holding chamber is being poured.

The succession of said function stages is represented in the FIGS. 6, 7 and 8. In the FIG. 6 it will be observed in detail that, when the container 3 is capsized, the product 8 contained therein flows with direction 81 through the first and the second openings, 26 and 44 respectively, of the first and second elements and it enters into the measuring chamber 42 of the second element 4 until it fills it up.

When the container 3 is brought back to its upright position, as can be observed in FIG. 7, the product contained in the measuring chamber 42 falls by gravity with direction 48 into the underlying holding chamber 22 belonging to the first element 2, wherein it remains until container 3 is capsized again, as can be observed in FIG. 8.

In FIG. 7 it will be observed that the openings 26 and 44 begin in correspondence with the upper rim 121 of the cylindrical zone 21 of the first element 2, so that, when the container is in its upright position, the openings 26 and 44 act as overflows thereby guaranteeing the permanence of the exact measured quantity in the holding chamber 22. This becomes particularly important when the container is capsized again with its cap closed and is then brought back to its upright position. In this case the quantity of product entering into the measuring chamber 42, which is in excess of the quantity which can be held in the holding chamber 22, fall back into the container, when the latter is brought back to its upright position.

When the container is tilted again, product 83 held in the holding chamber 22, goes by gravity through the dispensing duct 51 and it exits with direction 52, while, at the same time a new quantity of product 8 flows with direction 81 into the measuring chamber 42, thereby forming a new dose. As a consequence, after the first fill-up of the measuring chamber 42, the dispensing of the pre-determined quantity of product will occur every time container 3 is capsized.

As has already been said, it is easy to understand that the presence of the slanted matching surfaces, 28 and 29 of the first element 2 and 46 and 47 of the second element 4 respectively, improves the flow of the product 8 both during the fill-up stage of the measuring chamber 42 and during the dispensing stage of the product itself along the dispensing duct 51.

Thus the presence of said slanted surfaces permit to regulate the flow of the product, should the container be handled too abruptly or too slowly or should the container hold only a small amount of product.

In fact, in all these cases the presence of the mentioned slanted surfaces and of the openings 26 and 44 in the respective elements 2 and 4 in the side opposite to the dispensing duct 51, permits to obtain a rigorously constant measuring and dispensing of the product until the latter is completely exhausted.

Figure 9:
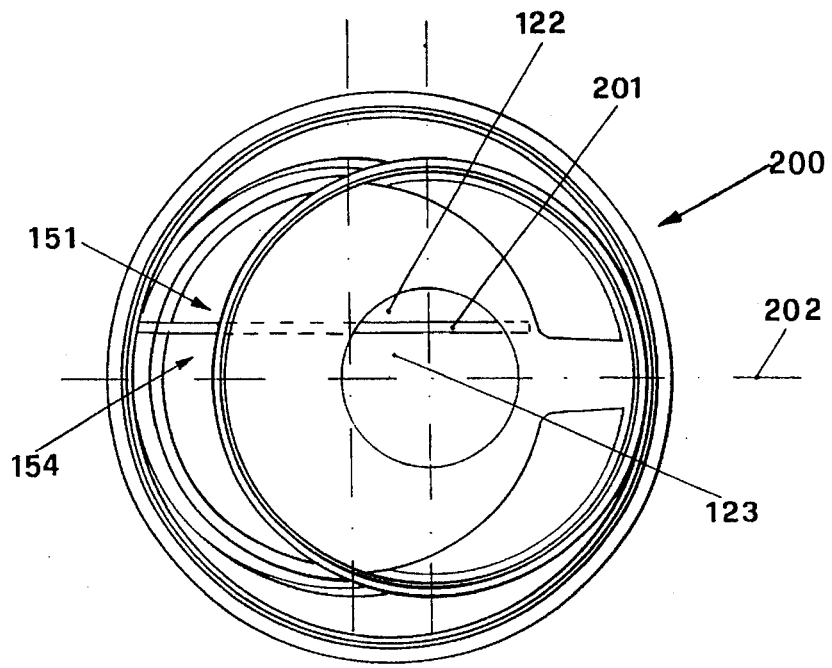
FIG. 9 shows a top view of a different embodiment of the measuring/dispensing device according to the invention, without its lid.
Figure 10:
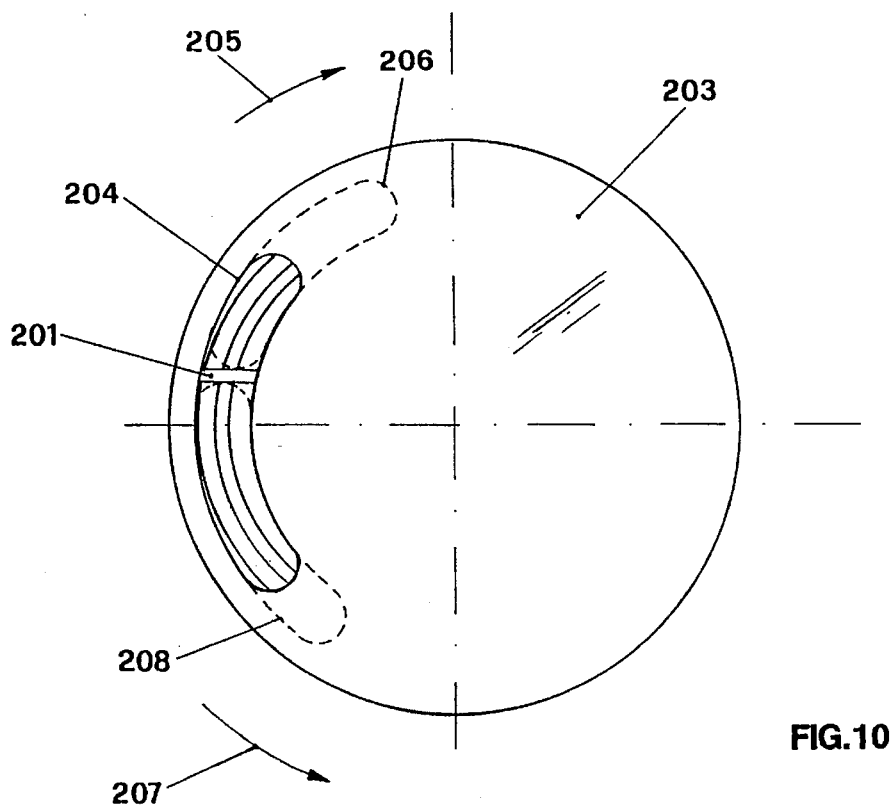
FIG. 10 shows the embodiment of the measuring/dispensing device of FIG. 9, complete with its lid.
Figure 11:
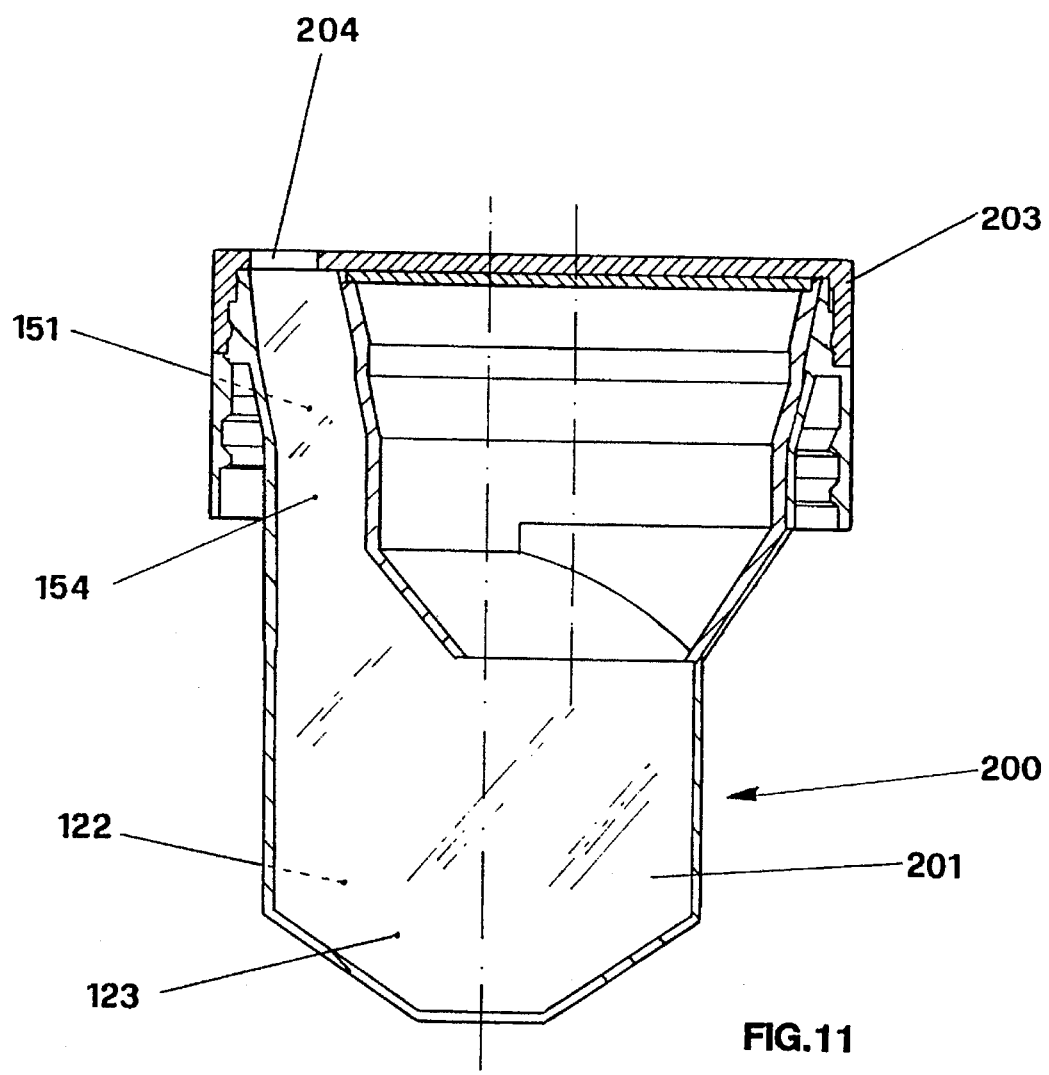
FIG. 11 shows a longitudinal cross-section of the embodiment of the measuring/dispensing device of FIG. 9.

A different embodiment of the measuring/dispensing device according to the invention is represented in the FIGS. 9, 10 and 11, wherein it can be observed that both the holding chamber and the dispensing duct in the first element 200 are divided by a longitudinal partition 201 defining two zones, 122 and 123 respectively for the holding chamber and two more zones, 151 and 154 respectively for the dispensing duct.

It will also be observed that said partition 201 is arranged so off center in relation to the axis 202 of said first element 200, that the volume of the two zones into which both the holding chamber and the dispensing duct are divided, differ from each other so as to contain different quantities of product.

Thus, it is possible to dispense three different quantities of product, according to different requirements as can be observed in FIG. 10.

In fact, as can be observed in FIG. 10, when lid 203 is positioned with its opening 204 centering both the zones 151 and 154 of the dispensing duct, all the quantity of product contained in both zones 122 and 123 of the holding chamber of the first element 200 is dispensed.

On the other hand, when, through a clockwise rotation, indicated with 205, the opening 204 is set in the position indicated with the dotted line 206, only zone 151 of the dispensing duct is allowed to dispense and, as a consequence, only the quantity held in zone 122 can exit.

In an analogous way by applying to the same lid 203 the anti-clockwise rotation 207, said opening 204 is arranged in the dotted-line position 208 which only involves the zone 154 of the dispensing duct, so that it only allows the product contained in the zone 123 in the holding chamber to come out.

It is obvious that by suitably positioning the longitudinal partition 201 it is possible to define the partial quantity according to the needs of the user.

Figure 12:
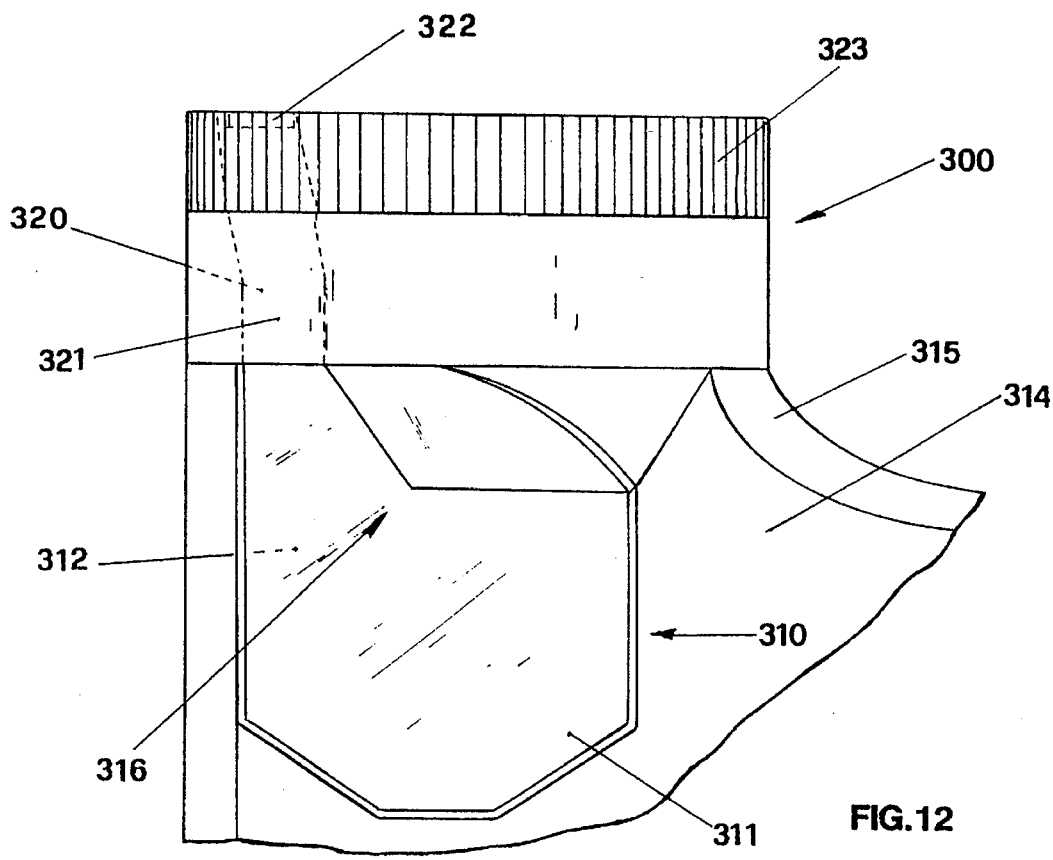
FIG. 12 shows a lateral, non-sectioned view of a different embodiment of the measuring/dispensing device.
Figure 13:
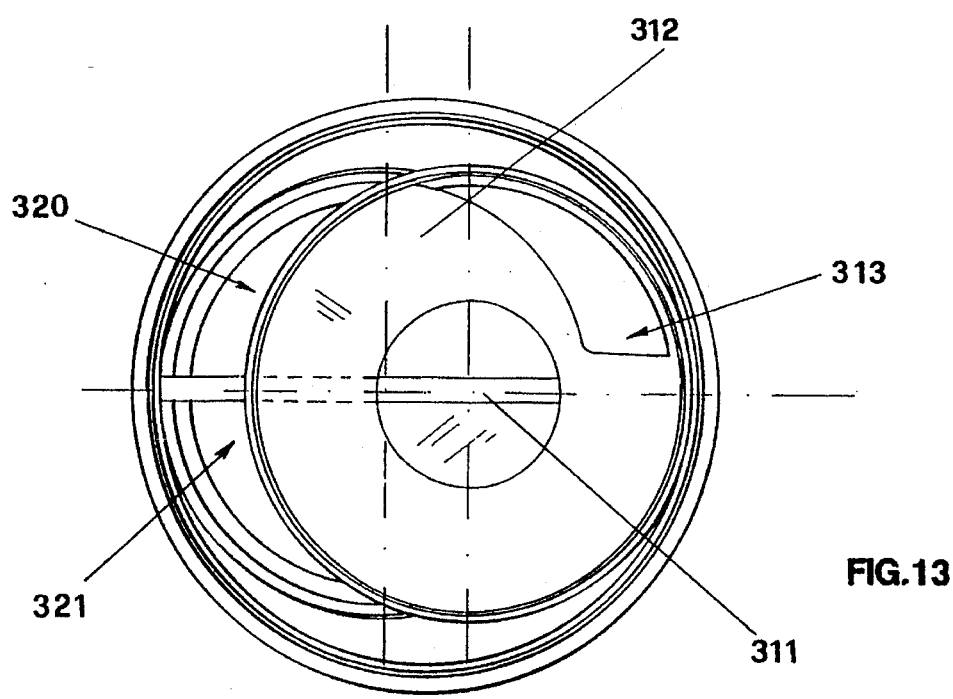
FIG. 13 shows a top view of the embodiment of FIG. 12.

Yet another embodiment is represented in the FIGS. 12 and 13, wherein it can be observed that the measuring/dispensing device, indicated as a whole with 300, presents its first element 310 complete with a longitudinal partition 311 and with an opening 316 made in the body of the first element 310, which is obtained by sectioning off longitudinally part of its length along the attachment edges of partition 311.

Said partition 311 defines then a holding chamber 312 into which the product to be measured enters through the opening 313 and a zone in correspondence with opening 316, which communicates with the inner volume 314 of container 315 on which the measuring device is applied.

Thus, as can be observed in FIG. 13, a dispensing duct is defined, which is divided into two sections and more precisely, a first section 320, which communicates with the holding chamber 312 and a second section 321 which communicates directly with the inner volume 314 of the container. Therefore, by suitably matching the opening 322 of lid 323 with one section of the dispensing duct or the other, it is possible to dispense the measured quantity or to dispense the product continuously.

On the basis of what has been described, it is easy to understand that the measuring/dispensing device according to the invention reaches all the proposed purposes, i.e. it guarantees the regular and constant filling and the emptying of the chambers, as well as the exactness of the measured and dispensed quantity, even in the case of abrupt or too slow handling of the container of when the quantity remaining in the container is very limited.

Moreover, the openings at the limit of the holding chamber act as overflows, thereby eliminating the possibility of double measurings due to repeated tiltings of the container, when the cap is closed.

It has also been seen that by interposing the longitudinal partition in the first element forming the measuring/dispensing device, it is possible to obtain also the measuring of partial quantities of product, by suitably rotating its lid.

Moreover, by adding, besides said partition, an opening made in the body of said element suited to set into communication the dispensing duct with the inside of the container, it is possible to obtain also the continuous outpour of the product.

During the manufacturing process the parts forming the measuring/dispensing device according to the invention may acquire shapes differring from the described ones, said shapes may become, for instance, elliptical or polyhedral rather than circular, as has been described and represented in the drawings.

It is, however, understood that said changes and variations still fall within the spirit and scope of the present invention.

I claim:

1. A device for measuring and dispensing granular or powder products from a container having an opening comprising:

a first element adapted to be secured on the container opening formed with an annular rim and a holding chamber for holding measured product, having a closed bottom; an overlying collecting chamber; a joining wall having at least one first opening connecting the holding chamber and said collecting chamber;

a second element located coaxially offset within the collecting chamber of the first element; a dispensing duct defined by said collecting chamber and said second element, said second element formed with a product measuring chamber having a first open bottom and a second opening connected with the at least one first opening of the first element;

a lid applied on the annular rim of the first element and having at least one opening communicating with the dispensing duct of the first element, for allowing dispensing of the product;

each of the first and second elements having corresponding slanted walls, a top and a circular bottom, said slanted walls of each of said first and second elements converging towards the bottom of the corresponding element.

2. A measuring and dispensing device according to claim 1 wherein said second element is inserted off center in the first element, so that said dispensing duct defined between the said first and second elements is arranged opposite the openings laterally formed in the first and second elements, said openings being each in correspondence with the slanted wall of the corresponding element.

3. A measuring and dispensing device according to claim 1 wherein the wall connecting the holding chamber and the collecting chamber of the first element in which said at least one first opening is formed comprises a first slanting wall converging towards the bottom of the first element, and a corresponding second slanted wall of the second element and in which the second opening is formed, said second slanted wall converging towards the bottom of said second element and the first slanted wall resting thereagainst.

4. A measuring and dispensing device according to claim 3 wherein said at least one first opening and said second opening coincide with each other.

5. A measuring and dispensing device according to claim 1 wherein the first element includes a vertical partition having lateral edges fixed both to an inner wall of the first element and to an outer wall of the second element said partition dividing the holding chamber and the dispensing duct of said first element into two zones separated from each other.

6. A measuring and dispensing device according to claim 5 wherein the first element has an opening positioned in front of the vertical partition formed by sectioning off a portion of the first element parallel to the partition in correspondence with a portion of its perimeter connecting the said partition with the first element, said opening being suited to set into communication the inner volume of the container on which the measuring device is applied directly with one of the parts into which said vertical partition divides the dispensing duct of the measuring device.

7. A device for measuring and dispensing granular or powdered materials from a container having an open top comprising:

a first element having an upper rim being adapted to be secured to the open top of the container, said first element formed with an inner wall defining holding chamber for holding measured product, and having a closed bottom, an overlying collecting chamber, and an adjoining wall having a first opening connecting the holding chamber and the collecting chamber;

a second element located coaxially offset and within the collecting chamber of the first element, said second element having an outer wall and defining a dispensing duct between said outer wall and the inner wall of the collecting chamber, said second element formed with a product measuring chamber having an open bottom and a second opening connected with the first opening of the first element; and a lid secured to the annular rim of the first element and having an opening communicating with the dispensing duct for allowing the dispensing of product therethrough, each of the first and second elements having slanted wall portions converging towards the bottom portion of the element.

* * * * *